US012561412B2

(12) United States Patent
Paulin et al.

(10) Patent No.: US 12,561,412 B2
(45) Date of Patent: Feb. 24, 2026

(54) PROVIDING DATA ACCESS TO A TECHNICAL FACILITY

(71) Applicant: Lenze SE, Aerzen (DE)

(72) Inventors: Werner Paulin, Worpswede (DE); Darius Felski, Lilienthal (DE); Sönke Heeren, Bremen (DE)

(73) Assignee: Lenze SE, Aerzen (DE)

( * ) Notice: Subject to any disclaimer, the term of this patent is extended or adjusted under 35 U.S.C. 154(b) by 376 days.

(21) Appl. No.: 18/111,947

(22) Filed: Feb. 21, 2023

(65) Prior Publication Data

US 2023/0281282 A1    Sep. 7, 2023

(30) Foreign Application Priority Data

Feb. 22, 2022    (DE) ......................... 102022104113.1

(51) Int. Cl.
*G06F 21/31* (2013.01)

(52) U.S. Cl.
CPC .................................... *G06F 21/31* (2013.01)

(58) Field of Classification Search
CPC ...................................................... G06F 21/31
See application file for complete search history.

(56) References Cited

U.S. PATENT DOCUMENTS

2013/0211547 A1    8/2013    Buchdunger et al.
2019/0036730 A1    1/2019    Dresselhaus et al.

2019/0354922 A1 *   11/2019   Berti ..................... G06K 7/1417
2020/0012249 A1 *    1/2020   Altendorf ............. H04W 12/06
2020/0349014 A1     11/2020   Chang et al.
2021/0248251 A1 *    8/2021   DeLuca .............. G06F 21/6218
(Continued)

FOREIGN PATENT DOCUMENTS

DE    10 2010 029 952 A1    12/2011
DE    10 2014 111 733 A1     2/2016
(Continued)

OTHER PUBLICATIONS

Gehrmann C, Gunnarsson M. A digital twin based industrial automation and control system security architecture. IEEE Transactions on Industrial Informatics. Sep. 2, 2019;16(1):669-80. (Year: 2019).*

(Continued)

*Primary Examiner* — James R Turchen
(74) *Attorney, Agent, or Firm* — Westborough IP Group, LLC

(57) ABSTRACT

The system described herein relates to providing data access to a technical facility, in particular a machine and/or an installation, where the technical facility is connected to a data-processing device via a network using a data-transmission interface. Using the data-processing device, a digital twin of the technical facility is provided. The digital twin represents modifiable software components of the technical facility. A specific UUID is allocated to each of the digital twin and the technical facility. Communication between the digital twin and the technical facility is made possible via the network using the UUID. The data-processing device provides an access option for access by third parties to data of the digital twin that relate to software components of the technical facility that are represented by the digital twin.

19 Claims, 2 Drawing Sheets

(56) References Cited

U.S. PATENT DOCUMENTS

| | | | |
|---|---|---|---|
| 2021/0357556 A1* | 11/2021 | Venkatapurapu | G06V 10/776 |
| 2021/0366586 A1* | 11/2021 | Ryan | G06Q 20/3224 |
| 2022/0141232 A1* | 5/2022 | Tang | G06F 21/602 |
| | | | 726/4 |
| 2022/0191648 A1* | 6/2022 | Smith | G06F 11/3089 |
| 2022/0292617 A1* | 9/2022 | Cassoli | G06Q 50/04 |
| 2024/0153328 A1* | 5/2024 | Oberste-Ufer | G05B 19/406 |

FOREIGN PATENT DOCUMENTS

| | | | |
|---|---|---|---|
| DE | 10 2016 107 491 A1 | 10/2017 | |
| DE | 10 2017 104 912 A1 | 9/2018 | |

OTHER PUBLICATIONS

Kern A, Anderl R. Using digital twin data for the attribute-based usage control of value-added networks. In2020 Seventh International Conference on Software Defined Systems (SDS) Apr. 20, 2020 (pp. 29-36). IEEE. (Year: 2020).*
Alam KM, El Saddik A. C2PS: A digital twin architecture reference model for the cloud-based cyber-physical systems. IEEE access. Jan. 23, 2017;5:2050-62. (Year: 2017).*
UUID as part of the standard ISO/IEC 11578:1996 "Information Technology—Open Systems Interconnection-Remote Procedure Call (RPC)," ISO/IEC 9834-8:2005, Abstract Only.
Wikipedia, Universally Unique Identifier (in German) Oct. 28, 2020, Machine Translation.

* cited by examiner

PROVIDING DATA ACCESS TO A TECHNICAL FACILITY

TECHNICAL FIELD

The system described herein relates to providing data access to a technical facility and more particularly to providing data access to a technical facility that may be a machine and/or an installation.

BACKGROUND

Technical facilities increasingly display great complexity. For control, the technical facilities accordingly possess programmable systems such as, for instance, programmable logic controllers and/or computers—in particular, embedded computers—which are also able to carry out complex control tasks. Also, after delivery and commissioning, it is often necessary to be able to access technical facilities of such a type using data access. For instance, data access may become necessary within the scope of maintenance work and/or repair work. In particular, by reason of the great complexity of technical facilities of such a type, it is frequently desired that such data access is able to be undertaken not merely by the operator but also by a third party. The third party may be, for instance, an employee of the manufacturer of the technical facility. Alternatively and/or supplementally, the third party may be a person appointed by the manufacturer and/or an employee of an enterprise appointed by the manufacturer.

According to the prior art, having a third party undertake data access may be done by, for instance, a physical connection being established on site between a data-processing device and the technical facility. For this purpose, a cable connection can, for instance, be created on site. However, such options are already comparatively laborious when the third party is already located on site. Otherwise, the third party first has to visit the technical facility.

However, it is frequently the case that data access—for instance, for remote-maintenance purposes and/or in order to update the software of the technical facility—is to be possible from any site. Therefore, it is known, for instance, to connect technical facilities of such a type to a data-processing device via a network using a data-transmission interface. The establishment of such a connection makes it possible to implement data access to the technical facility via the data-processing device using the network connection. However, such access options are not without problems. It is therefore often the case that operators of technical facilities are reluctant to make the necessary access information available to third parties. Technical installations of such a type are then typically addressed, for instance, via a certain IP address. As a rule, this address is unknown to the third party. In addition, such methods are susceptible to assignment errors, for instance if the wrong IP is accessed or if the wrong IP is made available to the third party. It may then be the case that the data access is erroneously undertaken on the wrong machine.

SUMMARY OF THE INVENTION

The system described herein provides data access to a technical facility by enabling data access to the technical facility in easy and secure manner.

Providing data access to a technical facility includes the technical facility being connected to a data-processing device via a network using a data-transmission interface.

The network may be the Internet, for instance. In particular, the data-processing device is located at a site remote from the technical facility. A "remote site" is to be understood to mean, in particular, a site that is located at least outside a bounded area in which the technical facility is located. In particular, the site may be at least 1 km, preferably at least 10 km, away from the technical facility.

Using the data-processing devices, a digital twin of the technical facility is provided. In this sense, a "digital twin" is to be understood to be, in particular, a digital representation of the technical facility. The digital representation reproduces, in particular, properties and features of the actual technical facility.

In this regard, the digital twin represents modifiable software components of the technical facility. The software components may be, for instance, parameters for control functions and/or regulation functions of the technical facility. Alternatively and/or supplementally, the software components may also be other software components, such as, for instance, predictive-maintenance software or condition-monitoring software. The predictive-maintenance software may have been designed to anticipate a need for maintenance, in particular using artificial-intelligence. Using the access to the digital twin, the software can be updated and adapted to new findings that, for instance, have been acquired by the manufacturer with respect to similar technical facilities after delivery of the technical facility. Condition-monitoring software can enable the manufacturer to monitor the technical facility using the access to the digital twin, for instance in order to fulfill a maintenance contract. Alternatively and/or supplementally, the access to the digital twin can be utilized in order to close security loopholes in the software components.

A UUID specific to the digital twin and/or to the technical facility is allocated to the digital twin and/or to the technical facility. A UUID, or Universal Unique Identifier, is an identifier that is generated in accordance with a previously defined technique. The technique is chosen in such a way that the UUID can be assumed to be globally unique. This means that although the probability of a UUID being generated twice is not zero, the probability is so low that the probability is negligible. The UUID can be generated independently of central registration and/or coordination—that is to say, the identities involved, in particular the technical facilities, can generate the UUIDs independently of one another without there being a serious risk of duplications occurring.

The UUID is, in particular, a UUID as documented and, in particular, defined as part of standard ISO/IEC 11578: 1996: *"Information Technology—Open Systems Interconnection—Remote Procedure Call (RPC)"*, or in standard ISO/IEC 9834-8:2005. But, alternatively and/or supplementally, other mechanisms for generating the UUIDs may also find application. It is essential that the resulting UUID for implementing the system described herein can be assumed with sufficient certainty to be unique.

Via the network, a communication between the digital twin and the technical facility is made possible using the UUID. The UUID as unique identifier makes it possible that the correct digital twin can be identified, in particular by the technical facility and/or by third parties; likewise, the technical facility can be identified by the data-processing device using the UUID. Third parties are, in particular, computers and/or users thereof connected to the data-processing device via a network, for instance the Internet.

The system described herein may specify that a specific UUID is allocated to each of the digital twin and the technical facility. In other words, a UUID specific to the digital twin is allocated to the digital twin, and a UUID specific to the technical facility is allocated to the technical facility. The two UUIDs may be assigned to one another. The assignment can be undertaken by, for instance, the data-processing device. In order to realize the assignment of the UUIDs, the assignments can be recorded, for instance in a data structure, for instance in an assignment table. This is undertaken, in particular, by the data-processing device. The UUIDs for the digital twin and for the technical facility can be generated independently of one another. By this mechanism, the system described herein can be set up very flexibly. In addition, using the UUIDs, it is possible not only to assign the digital twin and the technical facility to one another but also to distinguish the digital twin and the technical facility from one another on the basis of the UUIDs. Alternatively and/or supplementally, the system described herein may specify that a UUID specific to the technical facility and to the digital twin is assigned to the digital twin and to the technical facility. Via the UUIDs, the technical facility and the digital twin would then likewise be capable of being uniquely assigned to one another, since the UUID is identical for the technical facility and for the digital twin. In other words, a UUID specific to the technical facility is allocated to the technical facility, and the UUID for the technical facility is likewise allocated to the digital twin as UUID specific thereto, in particular by the data-processing device. This UUID can be generated by the technical facility, for instance.

Using the UUID, a communication between technical facility and data-processing device, in particular between the technical facility and the digital twin, is made possible in principle. The UUID serves, in particular, for finding and/or identifying the technical facilities and/or digital twins.

The data-processing device provides an access option for access by third parties to data of the digital twin. The access option may, in particular, be linked to user management. Using the user management, in particular the access authorizations of the users of the access option can be managed. In this regard, the data relate to software components of the technical facility that are represented by the digital twin.

The access option for the access by third parties to data of the digital twin is to likewise made possible, in particular, by the UUID, in particular by the UUID specific to the digital twin. In this way, the digital twin can be identified easily on the basis of the UUID. This makes it possible, in particular, for third parties to access the digital twin without thereby directly influencing the technical facility itself.

The system described herein therefore makes it possible to provide an "indirect" access to the technical facility. This access can be undertaken via the digital twin. Since the system described herein creates the possibility of an exchange of data between the digital twin and the technical facility, data access to the technical facility can be made possible for the third party via the detour of data access to the digital twin. The third party can connect to the data-processing device using known data-transmission techniques, for instance via the Internet, and can access the digital twin. The big advantage is that the data access can be undertaken in a site-independent manner. Also, no direct data access to the technical facility itself is required. A maximum of security can therefore be guaranteed, since technical restrictions for the data communication between the digital twin and the technical facility can be made independent of the access option of third parties to the digital twin.

In this way, teamwork, for example, can be performed with respect to the digital twin, in which computers and/or users thereof participate from differing sites. At the same time, however, a maximum of operational reliability remains guaranteed, since amendments with respect to the digital twin relate at first merely to the digital twin and do not necessarily relate directly to the technical facility itself.

In this context, the system described herein may specify, in particular, that the access option that is provided enables the third party to amend the data of the digital twin. In this way, for instance, a parameter that relates to a control function and/or regulation function of the technical facilities may be modifiable. In particular, in this way, errors in the software of the technical facility can be eliminated, updates of the software of the technical facility—such as, for instance, the importing of AI models—and diagnoses—in particular, of automation components of the technical facility—can be performed.

The system described herein may specify that the represented software components of the technical facility are adapted to amendments of the data of the digital twin. This can be undertaken by the technical facility, in particular in an automated manner. For instance, a time-controlled and/or event-controlled adaptation of the software components can be undertaken by the technical facility. A time-controlled adaptation of the software components may, for instance, specify a cyclic adaptation—that is to say, adaptations can be performed in an automated manner after the expiration of defined time-intervals, insofar as the data of the digital twin have been amended. Alternatively and/or supplementally, an event-controlled adaptation can be performed. For instance, the technical facility can perform an automated amendment of the represented software components as soon as an amendment of the data of the digital twin is detected by the technical facility, for instance by the technical facility receiving information relating to an amendment of the data of the digital twin using a data signal from the data-processing device.

In this way, the data access to the technical facility can be made easy to handle, since the technical facility "follows" the digital twin in an automated manner. Alternatively and/or supplementally, the adaptation of the software components of the technical facility to amendments of the data of the digital twin may depend on an approval by an authorized person. In this way, it can, for instance, be ensured that after project work, in the course of which amendments with respect to the digital twin by third parties have been approved, effects on the real technical facility arise only when the implemented amendments have been checked once again by a person with appropriate qualifications and/or authorization.

The system described herein may specify that the UUID specific to the technical facility is generated by the technical facility and is communicated to the data-processing device via the network. Alternatively and/or supplementally, the UUID can also be generated for the technical facility and, in particular, communicated to the data-processing device via the network.

The generation of the UUID for the technical facility can be undertaken, in particular, independently of the technical facility. For instance, already in the course of production of the technical facility the UUIDs thereof can be generated and allocated to the technical facility before the technical facility has ever been put into operation. The UUIDs can then be stored, for instance in the technical facility. Alternatively and/or supplementally, the UUIDs can also be made accessible in a different form; for instance, the UUIDs can be made accessible, in particular, in coded form. In this way, a technical facility can, for instance, be furnished with a QR code, or a QR code can be assigned to a technical facility, the QR code containing the UUID in coded form.

The system described herein may specify that the UUID specific to the technical facility is generated in the course of commissioning of the technical facility and is communicated to the data-processing device via the network. The generation of the UUID specific to the technical facility can be undertaken, in particular in an automated manner, in the course of the initial commissioning. In practice, this may mean that generation of the UUID specific to the technical facility is undertaken in an automated manner at the moment when a technical facility is connected up for the first time to a power supply for supplying the technical facility with electrical energy. In this way, the process of generating the UUID specific to the technical facility can take place straightforwardly and, in particular, without human involvement. In this regard, it is made possible, in particular, that in the course of being commissioned, the technical facility can be addressed in good time via the digital twin. In particular, by this mechanism, the data access via the digital twin is made possible "out of the box", so to speak, since the setting up of the digital twin can be undertaken in an automated manner after the connecting of the technical facility to the network and after the supplying of the technical facility with electrical energy.

The system described herein may, in particular, specify that the generation of the digital twin is undertaken by the data-processing device. The generation of the digital twin can be undertaken, in particular, in an automated manner.

The system described herein may further specify that data relating to the technical facility and which relate to the technical set-up and are utilized for the purpose of generating the digital twin are transmitted to the data-transmission device. In this regard, the transmitted data may relate to, in particular, the represented software components of the technical facility. The system described herein may specify that the transmission of the data is undertaken within the scope of commissioning. In this regard, the transmission of the data can, in particular, be undertaken in an automated manner. The system described herein may specify that the transmission of the data is undertaken in the course of the initial commissioning of the technical facility. The transmission of the data can be undertaken, in particular, in an automated manner in the course of the initial commissioning. In practice, this may mean that a transmission of the data is undertaken in an automated manner at the moment when a technical facility is connected up for the first time to a power supply for supplying the technical facility with electrical energy. Alternatively and/or supplementally, the transmission of the data may be triggered by a different event, for instance when the technical facility makes contact with the data-processing device for the first time via the network. In this way, the process of transmitting the data can take place straightforwardly and, in particular, without human involvement.

The transmission of such data makes it possible that the digital twin can be generated individually for the technical facility. This means that not only is a digital twin generated, the properties of which are the same for each technical facility, but a digital twin individually tailored to the technical facility can be generated by the transmitted data.

If, in addition to the UUID specific to the technical facility, for this purpose the further data which relate to the technical facility, in particular to the represented software components of the technical facility, are made available to the data-processing device, the data can be utilized in order to configure properties of the digital twin and/or to allocate initial values to the data of the digital twin that relate to the represented software components of the technical facility. The data necessary for the generation can be transmitted from the technical facility to the data-processing device.

Alternatively and/or supplementally, merely information relating to the technical facility may be transmitted that enables the data-processing device to obtain the data necessary for the generation of the digital twin, for instance by the data being retrieved from a data-storage device.

It is, for instance, possible to store a parameter set for a control function and/or regulation function of the technical facility in the technical facility, and to deliver the technical facility with the stored data set, so that the data set can be transmitted to the data-processing device in the course of commissioning.

Alternatively and/or supplementally, the parameter set can be stored in a data-storage device. The data that the technical facility transmits to the data-processing device enable the identification and, in particular, the obtainment of the parameters.

In other words, the parameters can either be delivered stored in the technical facility, and then transmitted to the digital twin, or the parameters are stored separately, and the technical facility is merely supplied with information that, when transmitted to the data-processing device, enables the obtainment of the parameters.

The system described herein may, in particular, specify that the communication between the digital twin and the technical facility is undertaken via a message broker. The message broker is software that is typically a component of message-oriented middleware. Such message brokers enable the exchange of information between software programs and/or parts of software programs using so-called messages, which can also be exchanged across networks. In connection with the system described herein, such a message broker, which is executed, in particular, in the data-processing device, enables, in particular, data access to a plurality of technical facilities via the data-processing device, which for this purpose can hold in readiness a corresponding plurality of digital twins corresponding with the technical facilities.

The system described herein may specify that a message queue assigned to the UUID specific to the technical facility and/or specific to the digital twin is managed by the message broker. A message queue makes it possible to "collect" messages and to hold the messages in readiness for retrieval. The message queue can, in particular, be managed in such a manner that only a one-time retrieval of the messages is possible. In this way, duplications of data accesses can be avoided which otherwise might possibly lead to malfunctions.

The system described herein may, in particular, specify that, in the event of an amendment of the data of the digital twin assigned to the UUID specific to the technical facility and/or assigned to the UUID specific to the digital twin, a message relating to the amendments of the data is set up in the message queue. This is undertaken by the data-processing device, in particular in an automated manner. In this way, amendments to the data of the digital twin can be performed, regardless of whether the represented software components of the technical facility have already been adapted to the amended data of the digital twin. In the event of an amendment of the data of the digital twin assigned to the UUID specific to the technical facility and/or assigned to the UUID specific to the digital twin, the setting up of a corresponding message in the message queue, in which the messages are held available for retrieval by the technical facility, can be undertaken. The setting up of the message is preferably undertaken after an approval by a user.

The system described herein may specify that the existence of a connection to the data-processing device via the network is checked by the technical facility. This check is undertaken, in particular, in an automated manner. The system described herein may specify that an automated retrieval of the messages is undertaken by the technical facility in the case where the to network connection exists. In other words, in the case where a connection to the data-processing device exists, the technical facility "picks up" the messages intended for the technical facility. In this way, the data access to the technical facility via the digital twin can be undertaken without the technical facility having to be "actively" accessed by the data-processing device.

In this context, the system described herein may specify that the messages in the message queue are retrieved by the technical facility. In this way, a communication from the digital twin to the technical facility, and hence the desired enabling of the data access to the technical facility via the digital twin, is made possible.

In this regard, the retrieval of the messages requires, in particular, an identification of the technical facility via the UUID specific to the technical facility. In this way, it is ensured that the messages from a message queue are retrieved only by the technical facility and in particular can only be retrieved by the technical facility for which the messages are intended.

The system described herein can be executed with a plurality of technical facilities connected to the data-processing device via the network. In this way, an easy access to a plurality of technical facilities can be made possible. In this regard, the UUIDs make it possible, in particular, that the amendments of the data of the digital twins lead to a corresponding data access to the correct technical facility. Particularly when the data access is undertaken via a message queue as described above, a secure and easy "indirect" data access to the technical facility via the respective digital twin is made possible.

The data-processing device is, in particular, a cloud computing system. Such a cloud computing system makes it possible to distribute, within the scope of the implementation of the system described herein, the execution of the tasks of the data-processing device to a plurality of computer resources.

The technical facility may exhibit a control device such as, for instance, a programmable logic controller. If the control device is designed—for instance, by the installing of suitable software—to implement steps of the system described herein that are to be implemented by the technical facility—that is to say, in particular, the generating of the UUID specific to the technical facility, the transmitting of the UUID specific to the technical facility and, where appropriate, of further data to the data-processing device, and/or the retrieval of the messages—then data accesses necessary for the operation of the technical facility, preferably all the data accesses necessary for the operation of the technical facility, can be made possible via the digital twin. The software of the control device that is suitable for the implementation of the system described herein may, in particular, have the functionality of a gateway.

Alternatively and/or supplementally, the software can be executed on a computer connected to the control device. This has the advantage, in particular, that the control device does not have to have been designed to execute this software for the purpose of implementing the system described herein. In addition, the control device does not have to have been designed to be connected to the Internet. The computer on which the software for executing the system described herein is executed may, in principle, have been connected to the control device via any data connection. The computer and/or the software executed on the computer may in this context provide, in particular, the function of a gateway that enables a connection between the data connection and the network, in particular the Internet, via which the computer is connected to the data-processing device and consequently to the digital twin.

Alternatively and/or supplementally, it is possible that the communication between the digital twin and the technical facility is enabled by a plurality of gateways, in particular where the gateways have been set up to provide a redundancy for the function of the gateway.

This has the advantage, in particular, that the system described herein can also be utilized for existing technical facilities that merely have to be supplemented by an appropriate computer connected to the control device. In this context, the computer with the software designed for executing the system described herein constitutes a component of the technical facility in to the sense of the system described herein, and serves, in particular, as a gateway for communication between the technical facility and the digital twin. In this regard, the software is designed, in particular, to implement the steps of a method for the system described herein that are to be implemented since the technical set-up.

The technical facility may be, in particular, a technical facility that exhibits, in particular, an electric drive system and a control device, in particular for controlling the electric drive system, and, in particular, a computer connected to the control device. In this regard, the control device and/or the computer have/has been designed and/or set up to connect to a network for the purpose of executing a method of the system described herein, and to implement the steps of the method that are to be implemented by the technical facility.

In particular, the control devices of electric drive systems often exhibit software that is parametrizable in a complex manner. Technical facilities of such a type can therefore be made accessible for data access in a particularly advantageous manner using the system described herein.

BRIEF DESCRIPTION OF DRAWINGS

Further practical embodiments and advantages of the system described herein are set forth below in connection with the drawings.

DETAILED DESCRIPTION OF VARIOUS EMBODIMENTS

Figure 1:
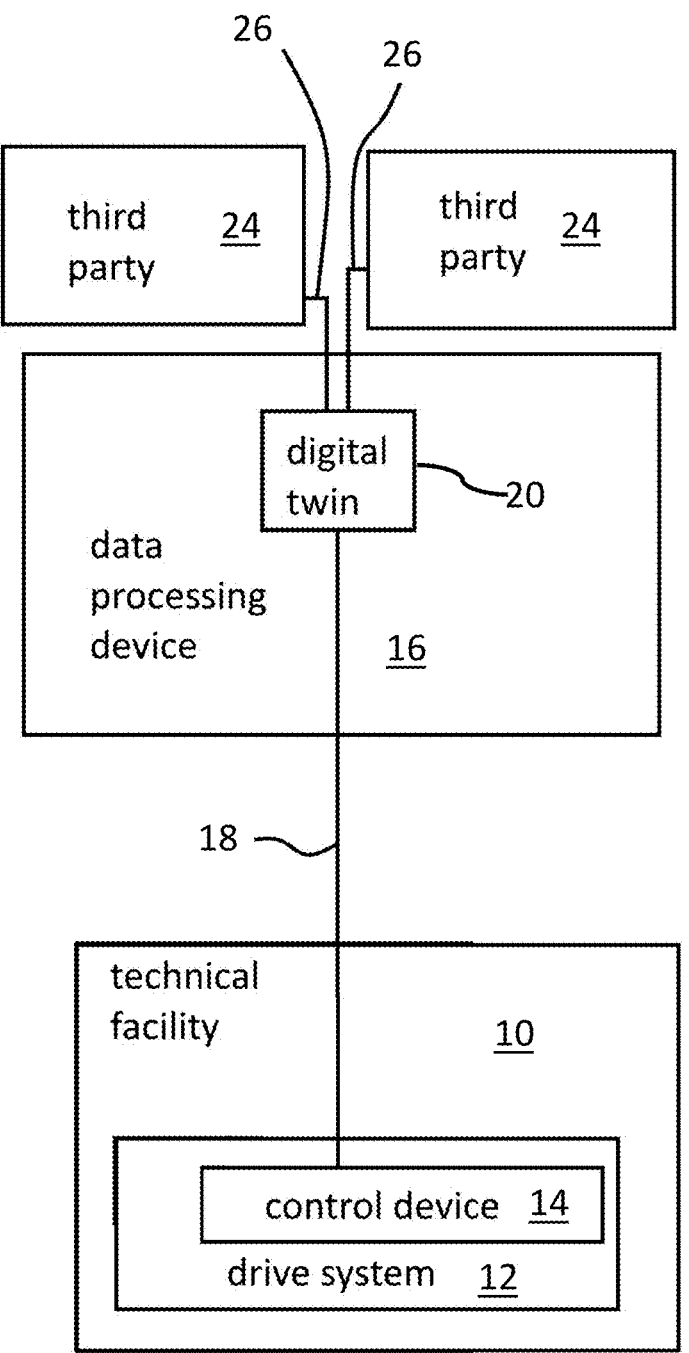
FIG. 1 shows a schematic representation of data-communication channels between entities according to a first exemplary embodiment of the system described herein.
Figure 2:
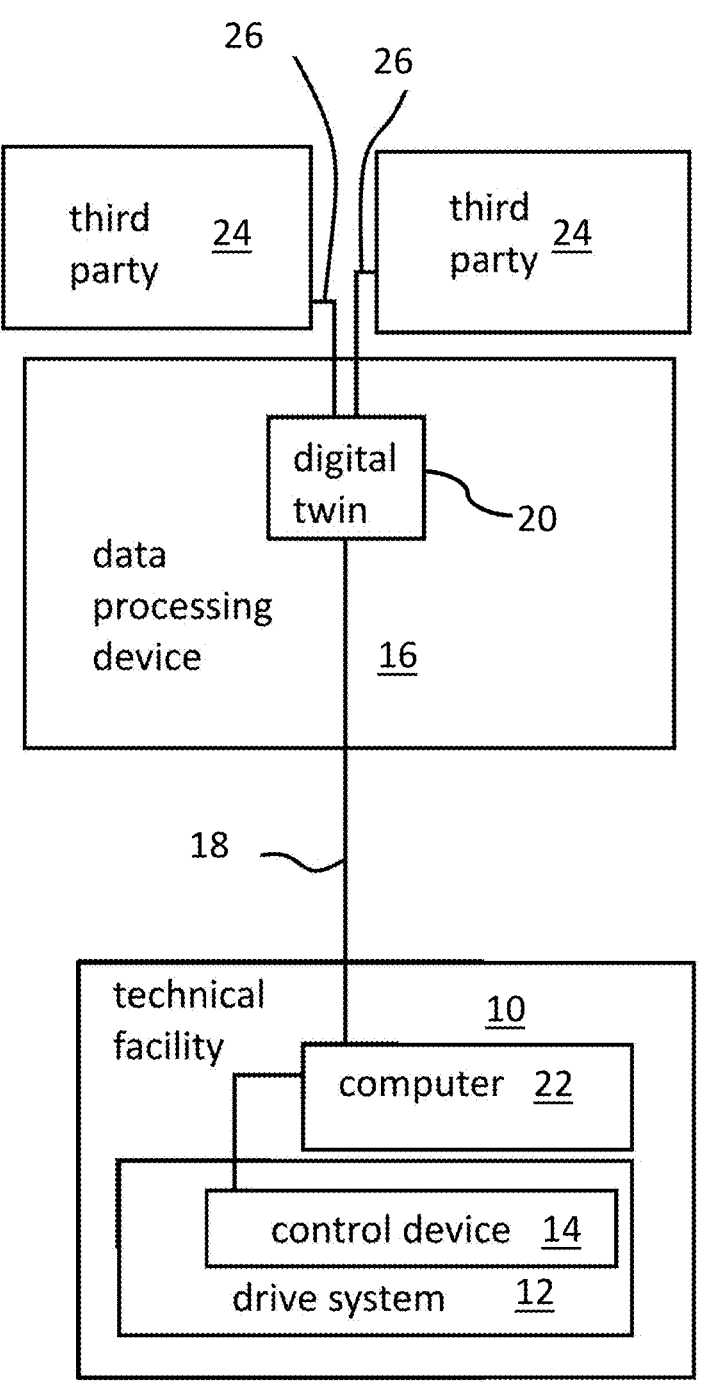
FIG. 2 shows a schematic representation of data-communication channels between entities according to a second exemplary embodiment of the system described herein.

In each of FIGS. 1 and 2 a technical facility 10 is represented schematically. The technical facility 10 may, for instance, include a drive system 12 which, in turn, exhibits a control device 14. The control device 14 may be, for instance, a programmable logic controller.

A data-processing device 16 is connected to the technical facility 10 via a network 18 which, for instance, may be the Internet. The data-processing device 16 provides a digital twin 20 of the technical facility 10. The digital twin 20 represents modifiable software components of the technical facility 10. A UUID specific to the digital twin 20 and/or to the technical facility 10 is allocated to the digital twin 20 and/or to the technical facility 10. Using the UUID(s), a communication between the digital twin 20 and the technical facility 10 via the network 18 is enabled, where there is the possibility that, as represented in an exemplary manner in FIG. 1, steps of a method that are to be implemented by the technical facility 10 are executed using software executed in the control device 14, which, in particular, may have the functionality of a gateway. Alternatively and/or supplementally, as represented in an exemplary manner in FIG. 2, the technical facility 10 may exhibit a computer 22 connected to the control device 14, in which case steps of a method that are to be implemented by the technical facility 10 are implemented using software executed on the computer 22, which, in particular, has the functionality of a gateway.

The system described herein enables the provision of data access to the technical facility 10 by providing an access option for access by third parties 24 to data of the digital twin 20 that relate to software components of the technical facility 10 that are represented by the digital twin 20. The third parties 24 may be computers and/or users thereof which are connected using a network 26, which may be the Internet, to the data-processing device 16, and via the latter to the digital twin 20.

The features of the invention disclosed in the present description and also in the claims may be essential, both individually and in any combinations, for the realization of the invention in its various embodiments. The invention is not restricted to the embodiments described; it may be varied within the scope of the claims and taking the knowledge of the competent person skilled in the art into consideration.

The invention claimed is:

1. A method for providing data access to a technical facility that is connected to a data-processing device via a network using a data-transmission interface, the method comprising:

the data-processing device providing a digital twin of the technical facility that represents modifiable software components of the technical facility, wherein a Universal Unique Identifier (UUID) specific to the digital twin and/or to the technical facility is allocated to the digital twin and/or to the technical facility and wherein the digital twin communicates with the technical facility via the network using the UUID; and the data-processing device providing an access option for access by third parties to data of the digital twin that relate to software components of the technical facility that are represented by the digital twin, wherein communication between the digital twin and the technical facility is undertaken via a message broker and wherein the data are retrieved by the technical facility and wherein retrieval of the data requires an identification of the technical facility using the UUID specific to the technical facility.

2. The method as claimed in claim 1, wherein a specific UUID is allocated to each of the digital twin and the technical facility and the two UUIDs are assigned to one another.

3. The method as claimed in claim 2, wherein the two UUIDs are assigned to one another by the data-processing device.

4. The method as claimed in claim 1, wherein the UUID specific to the technical facility is allocated thereto, and the UUID is allocated to the digital twin.

5. The method as claimed in claim 4, wherein the UUID is allocated to the digital twin by the data-processing device.

6. The method as claimed in claim 1, wherein the modifiable software components of the technical facility are adapted to amendments of the data of the digital twin.

7. The method as claimed in claim 6, wherein the modifiable software components of the technical facility are adapted by the technical facility in an automated manner.

8. The method as claimed in claim 1, wherein the UUID specific to the technical facility is generated in connection with initial commissioning of the technical facility.

9. The method as claimed in claim 1, wherein generation of the digital twin is undertaken by the data-processing device.

10. The method as claimed in claim 1, wherein data relating to the technical facility that relate to technical set-up are transmitted to the data-processing device and are used to generate the digital twin.

11. The method as claimed in claim 10, wherein data relating to the technical facility that relate to the technical set-up are transmitted to the data-processing device in connection with initial commissioning of the technical facility.

12. The method as claimed in claim 1, wherein existence of a connection to the data-processing device via the network is checked by the technical facility and an automated retrieval of the messages is undertaken by the technical facility in response to the network connection existing.

13. The method as claimed in claim 1, wherein the technical facility includes a control device that executes steps corresponding to the modifiable software components.

14. The method as claimed in claim 1, wherein the data-processing device is a cloud computing system.

15. The method as claimed in claim 1, wherein the access option that is provided enables the third party to modify the data of the digital twin.

16. A technical facility, comprising:

an electric drive system; and a control device the control device providing a digital twin of the technical facility that represents modifiable software components of the technical facility, wherein a Universal Unique Identifier (UUID) specific to the digital twin and/or to the technical facility is allocated to the digital twin and/or to the technical facility, the digital twin communicating with the technical facility via a network using the UUID, and the control device providing an access option for access by third parties to data of the digital twin that relate to software components of the technical facility that are represented by the digital twin, wherein the data are retrieved by the technical facility and wherein retrieval of the data requires an identification of the technical facility using the UUID specific to the technical facility.

17. A method for providing data access to a technical facility that is connected to a data-processing device via a network using a data-transmission interface, the method comprising:

the data-processing device providing a digital twin of the technical facility that represents modifiable software components of the technical facility, wherein a Universal Unique Identifier (UUID) specific to the digital twin and/or to the technical facility is allocated to the digital twin and/or to the technical facility and wherein the digital twin communicates with the technical facility via the network using the UUID; and the data-processing device providing an access option for access by third parties to data of the digital twin that relate to software components of the technical facility that are represented by the digital twin, wherein communication between the digital twin and the technical facility is undertaken via a message broker and wherein a message queue is assigned to the UUID specific to the technical facility and/or assigned to the UUID specific to the digital twin and is managed by the message broker.

18. A method for providing data access to a technical facility that is connected to a data-processing device via a network using a data-transmission interface, the method comprising:

the data-processing device providing a digital twin of the technical facility that represents modifiable software components of the technical facility, wherein a Universal Unique Identifier (UUID) specific to the digital twin and/or to the technical facility is allocated to the digital twin and/or to the technical facility and wherein the digital twin communicates with the technical facility via the network using the UUID; and the data-processing device providing an access option for access by third parties to data of the digital twin that relate to software components of the technical facility that are represented by the digital twin, wherein in response to an amendment of the data of the digital twin assigned to the UUID specific to the technical facility and/or assigned to the UUID specific to the digital twin, a message relating to amendment of the data is set up in a message queue and wherein the digital twin is assigned to the UUID specific to the technical facility and/or is assigned to the UUID specific to the digital twin after an approval by a user.

19. The method as claimed in claim 18, wherein communication between the digital twin and the technical facility is undertaken via a message broker.

* * * * *